(12) United States Patent
Zhang

(10) Patent No.: US 11,614,740 B2
(45) Date of Patent: Mar. 28, 2023

(54) DETERMINING SPEEDS FOR AN AUTONOMOUS VEHICLE

(71) Applicant: Baidu USA LLC, Sunnyvale, CA (US)

(72) Inventor: Yajia Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 520 days.

(21) Appl. No.: 16/424,224

(22) Filed: May 28, 2019

(65) Prior Publication Data
US 2020/0379474 A1 Dec. 3, 2020

(51) Int. Cl.
*G05D 1/02* (2020.01)
*B60W 30/14* (2006.01)
*G06V 20/58* (2022.01)

(52) U.S. Cl.
CPC ......... *G05D 1/0223* (2013.01); *B60W 30/146* (2013.01); *G05D 1/0238* (2013.01); *G06V 20/58* (2022.01); *B60W 2552/30* (2020.02); *B60W 2554/00* (2020.02); *G05D 2201/0213* (2013.01)

(58) Field of Classification Search
CPC ............... G05D 1/0223; G05D 1/0238; G05D 2201/0213; B60W 30/146; B60W 2552/30; B60W 2554/00; B60W 60/0015; B60W 40/105; B60W 50/00; B60W 2050/0021; B60W 2050/0063; G06K 9/00805
See application file for complete search history.

(56) References Cited

U.S. PATENT DOCUMENTS

2015/0353082 A1* 12/2015 Lee ................. B60W 30/10 701/41
2017/0349178 A1* 12/2017 Suzuki ............ B60W 30/16
2018/0284782 A1* 10/2018 Kalabic ........... B60W 30/06
2019/0369626 A1* 12/2019 Lui ..................... G06F 30/20
2020/0031340 A1* 1/2020 Tao ............... B60W 30/0956

* cited by examiner

*Primary Examiner* — Abby Y Lin
*Assistant Examiner* — Renee LaRose
(74) *Attorney, Agent, or Firm* — Womble Bond Dickinson (US) LLP

(57) ABSTRACT

In one embodiment, a method is provided. The method includes determining a first reference line representing a path through an environment for an autonomous driving vehicle. The method also includes determining a speed constraint function based on a set of speed limits associated with the environment, a set of curvatures of the path, and a set of obstacles in the environment, wherein the speed constraint function comprises a continuous function. The method further includes determining a set of speeds for the path through the environment based on the speed constraint function. The method further includes controlling the autonomous driving vehicle based on the path and the set of speeds.

20 Claims, 11 Drawing Sheets

DETERMINING SPEEDS FOR AN AUTONOMOUS VEHICLE

TECHNICAL FIELD

Embodiments of the present disclosure relate generally to operating autonomous vehicles. More particularly, embodiments of the disclosure relate to determining speeds for an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. A path describes the geometric shape of the movement for autonomous vehicles. Various factors affect the desirability of any given path, including those relating to passenger comfort and safety.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Some embodiments relate to a method, apparatus, and system for controlling an autonomous driving vehicle (ADV). The ADV may determine a set of speeds based on a speed constraint function. The speed constraint function may represent a set of speed limits associated with an environment where the ADV is located, a set of curvatures of the path of the ADV, and a set of obstacles in the environment. The speed constraint function may be a single, continuous, differentiable function. The speed constraint function may be generated from multiple, separate functions (e.g., one function representing each of the set of speed limits associated with an environment where the ADV is located, the set of curvatures of the path of the ADV, and the set of obstacles in the environment. At least one of the separate functions may be discontinuous and/or not differentiable. The ADV may generate the speed constraint function by discretizing the separate functions, obtaining values for the functions at the discrete points, forming segments, and generating polynomial functions for the different segments.

Figure 1:
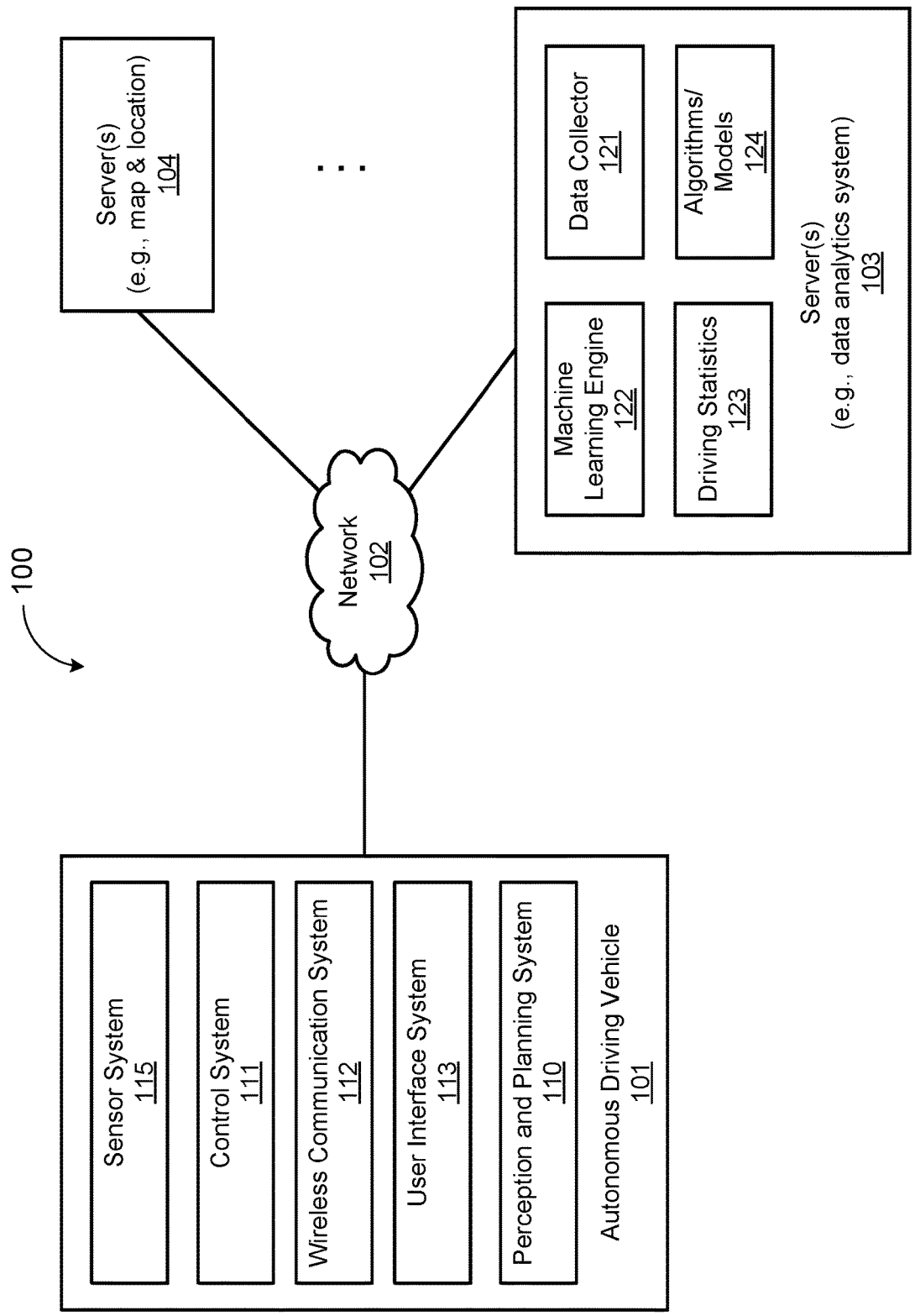
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. Hereinafter the terms "autonomous vehicle" and "autonomous driving vehicle" (ADV) may be used interchangeably.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
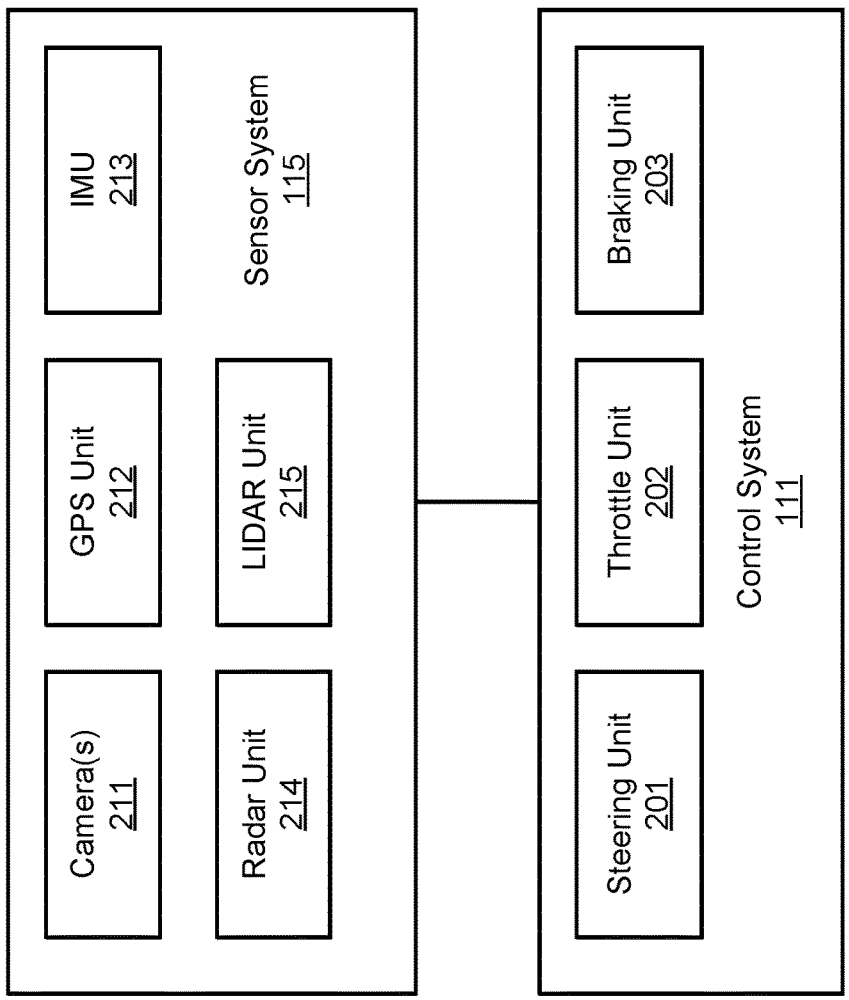
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan a path or a route, and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an path algorithm that receives inputs, constraints, and a cost function, and generates an path for the ADV, taking into account the comfort level associated with the path as well as the preference for the path to stay close to the lane center line and away from obstacles with a buffer. A cost function for the path planning may also be generated as a part of algorithms 124. Algorithms 124 can then be uploaded on ADVs to be utilized during autonomous driving in real-time.

Figure 3A:
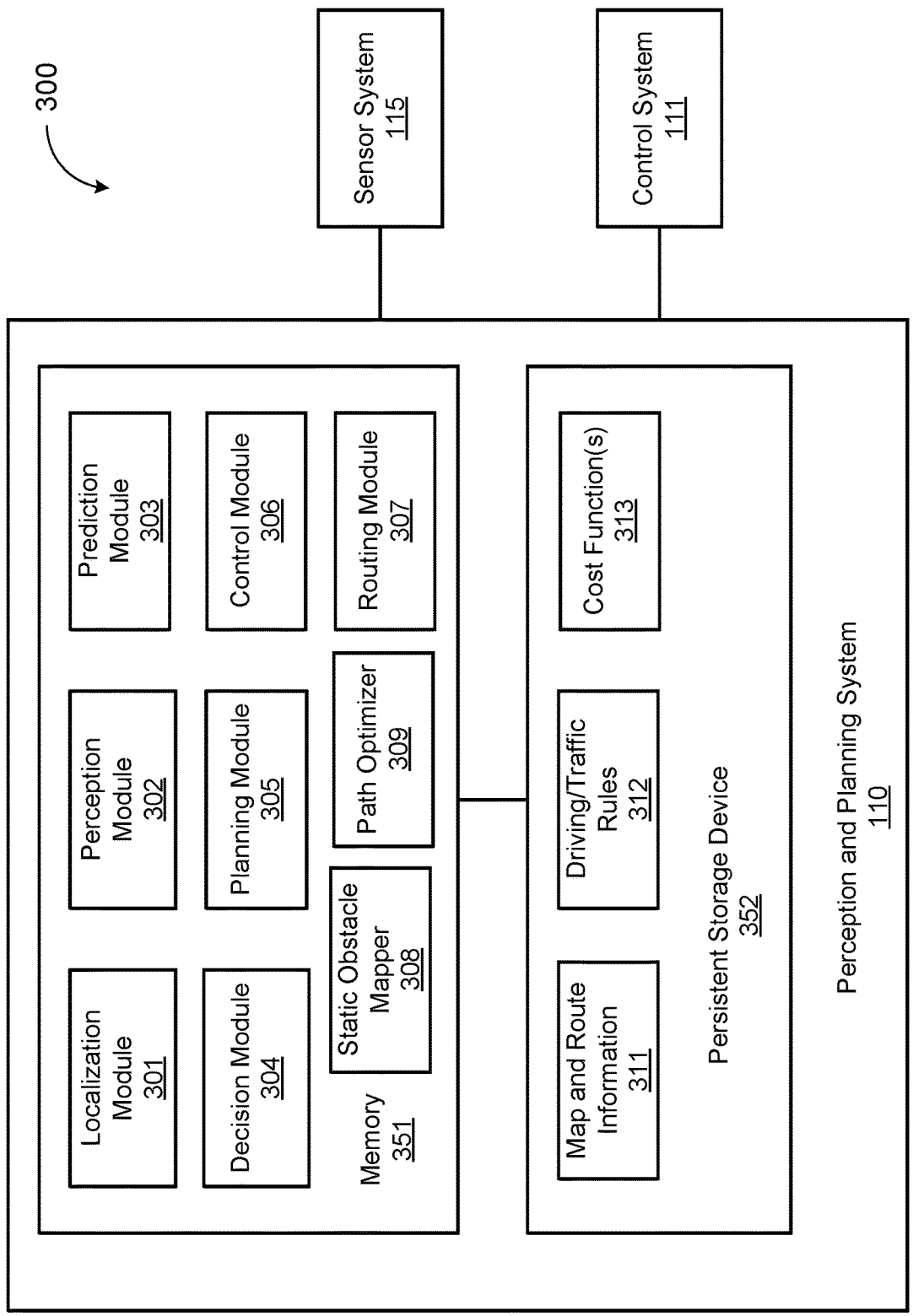
FIGS. 3A-3B are block diagrams illustrating an example of a perception and planning system used with an autonomous vehicle according to one embodiment.
Figure 3B:
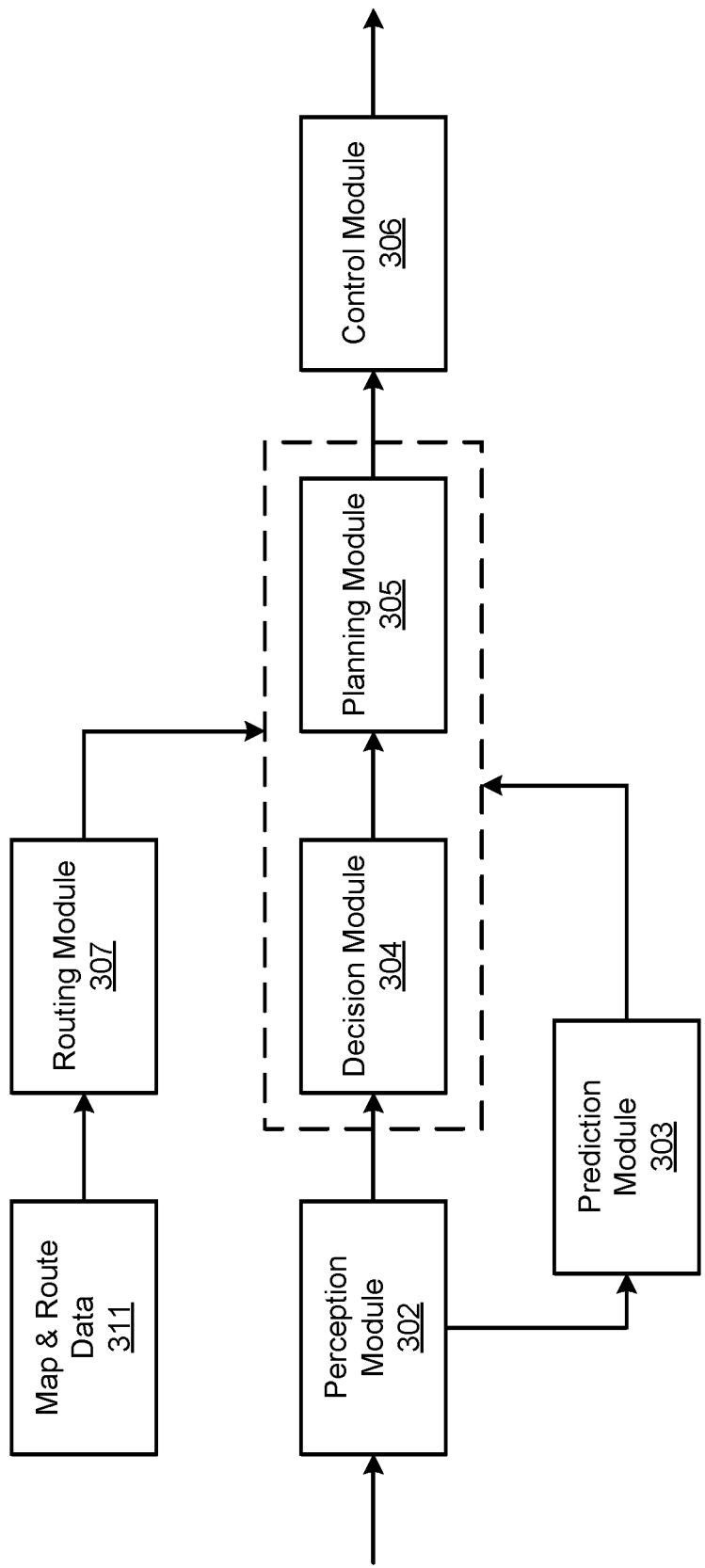

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, static obstacle mapper 308, path planner 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

As part of the planning process, the path planner 309 may generate a plurality of planned ADV states based on a cost function 313, which may be stored in persistent storage device 352.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, paths are planned in an SL-coordinate system. The SL-coordinate system may be defined relative to the reference line (road/lane center line). The longitudinal distance, or s-distance, represents the distance along the tangential direction of the reference line. Correspondingly, the lateral distance, or l-distance, represents the distance perpendicular to the s-direction. The longitudinal dimension in the SL space represents a longitudinal distance of a particular object from a current location of the vehicle that is presumably drives along the reference line. The lateral dimension in the SL space represents the shortest distance between the object and the reference line at a particular time or location represented by the longitudinal dimension. Such a graph in the SL space is referred to as an SL graph. In one embodiment, the lateral distance may be simply defined as the distance from the reference line. Therefore, in addition to representation in the Cartesian coordinate system (XY plane), a vehicle position (pose) may be represented in the SL-coordinate system as an ordered pair (longitudinal pose/position "s-pose", lateral pose/position "l-pose"), or simply (s, l), with respect to a reference line.

Figure 4:
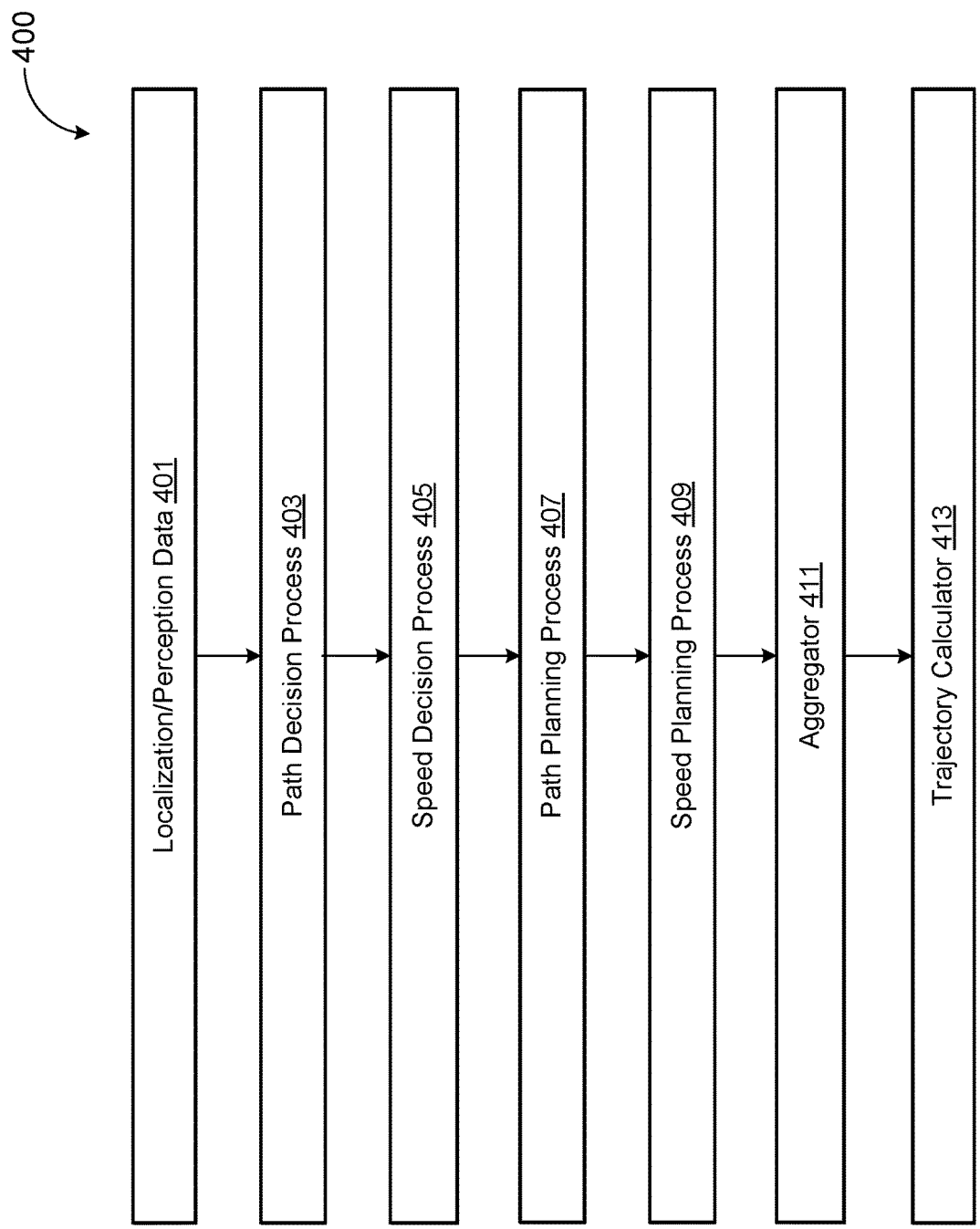
FIG. 4 is a block diagram illustrating an example of a decision and planning process according to one embodiment.

FIG. 4 is a block diagram illustrating an example of a decision and planning process 400 according to one embodiment. Decision and planning process 400 includes localization/perception data 401, path decision process 403, speed decision process 405, path planning process 407, speed planning process 409, aggregator 411, and trajectory calculator 413.

Path decision process 403 and speed decision process 405 may be performed by decision module 304 illustrated in FIG. 3B. Referring to FIG. 3B, the decision module 304 may generate a rough path profile as an initial constraint for the path/speed planning processes 407 and 409 using dynamic programming. The decision module 304 may use a path state machine that provides previous planning results and important information such as whether the ADV is cruising or changing lanes, and traffic rules. From the states, traffic rules, reference line provided by routing module 307, and obstacles perceived by the ADV, path decision process 403 can decide how the perceived obstacles are handled (i.e., ignore, overtake, yield, stop, pass), as part of a rough path profile.

For example, in one embodiment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time. Dynamic programming (or dynamic optimization) may be a mathematical optimization method that breaks down a problem to be solved into a sequence of value functions, solving each of these value functions just once and storing their solutions. The next time the same value function occurs, the previous computed solution is simply looked up saving computation time instead of re-computing its solution.

Speed decision process 405 may use a speed state machine, speed traffic rules, and one or more station-time graphs. Speed decision process 405 can generate a rough speed profile as an initial constraint for the path/speed planning processes 407 and 409 using dynamic programming. From a state of the speed state machine, speed traffic rules, rough path profile generated by decision process 403, and perceived obstacles, speed decision process 405 can generate a rough speed profile to control when to speed up and/or slow down the ADV.

Path planning process 407 may use may use a rough path profile (e.g., a station-lateral map) as the initial constraint to recalculate an optimal reference line using quadratic programming. Quadratic programming involves minimizing or maximizing an objective function (e.g., a quadratic function with several variables) subject to bounds, linear equality, and/or inequality constraints. One difference between dynamic programming and quadratic programming is that quadratic programming optimizes all candidate movements for all points on the reference line at once. The path planning process 407 may apply a smoothing algorithm (such as B-spline or regression) to the output station-lateral map. Path costs may be used to recalculate a reference line with a path cost function to optimize a total cost for candidate movements for reference points, for example, using quadratic programming (QP) optimization.

Speed planning process 409 may use a rough speed profile (e.g., a station-time graph) and one or more S-T graphs to determine one or more speeds for the ADV. In some embodiments, the S-T graph may include an S-T trajectory. An S-T trajectory may indicate the distance travelled by the ADV along the path at different points in time, as discussed in more detail below. Thus, the S-T trajectory (of the S-T graph) maybe used to indicate or determine the speed of the car at different points in time. The S-T graph may also include or indicate one or more stop conditions. For example, the S-T graph may also indicate distances and times at which the ADV should stop to avoid an obstacle, such as a pedestrian, a sidewalk, a roadway divider (e.g., a center divide), another vehicle, etc. Although an ST-graph may be described in FIG. 4, other types of graphs (e.g. SL graphs, graphs that use Cartesian coordinate systems, etc.) may be used in other embodiments. The speed planning process 409 may also use one or more constraints to determine one or more speeds for the ADV. A constraint may be one or more conditions that should be satisfied when the speed planning process 409 determines the set of speeds. For example, a constraint may be a condition imposed on the QP optimization problem which candidate solutions should satisfy. The one or more constraints may be represented using a speed constraint function, as discussed in more detail below.

Aggregator 411 performs the function of aggregating the path and speed planning results. For example, in one embodiment, aggregator 411 can combine the two-dimensional S-T graph and S-L map into a three-dimensional SLT graph. In another embodiment, aggregator 411 can interpolate (or fill in additional points) based on 2 consecutive points on a S-L reference line or S-T curve. In another embodiment, aggregator 411 can translate reference points from (S, L) coordinates to (x, y) coordinates. Trajectory generator 413 can calculate the final trajectory to control the ADV. For example, based on the SLT graph provided by aggregator 411, trajectory generator 413 calculates a list of (x, y, T) points indicating at what time should the ADC pass a particular (x, y) coordinate.

Thus, referring back to FIG. 4, path decision process 403 and speed decision process 405 are to generate a rough path profile and a rough speed profile taking into consideration obstacles and/or traffic conditions. Given all the path and speed decisions regarding the obstacles, path planning process 407 and speed planning process 409 are to optimize the rough path profile and the speed profile in view of the obstacles using QP programming to generate an optimal trajectory with minimum path cost and/or speed cost.

Figure 5:
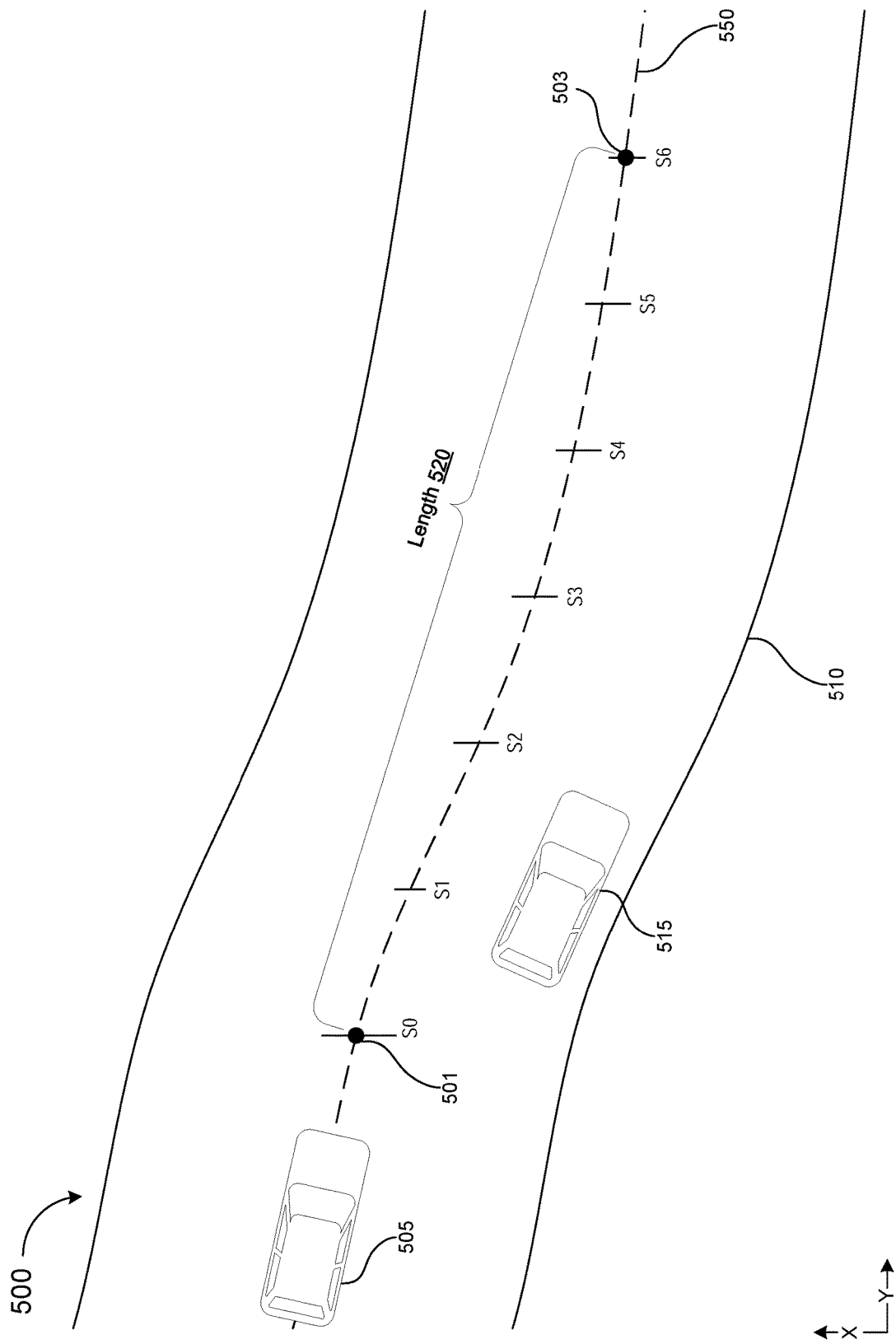
FIG. 5 illustrates an example environment 500 where an ADV 500 may be located according to one embodiment.

FIG. 5 illustrates an example environment 500 where an ADV 500 may be located according to one embodiment. The environment 500 includes An ADV 505 traveling on a road 510 and reference line 550 that may represent a path for the ADV 505 along the road 510. The reference line 550 and/or the path may be determined (e.g., may have previously been determined, calculated, generated, etc.) by the planning process 407 or planning module 305, as discussed above. The reference line 550 includes initial (e.g., beginning, starting, etc.) location 501 and a destination (e.g., final, ending, etc.) location 503. The initial location 501 may be a current location of the ADV 505 while destination location 503 may be a target location to be reached. The environment 500 also includes another vehicle 515. The vehicle 515 maybe an obstacle for the ADV 500. For example, the reference line 550 may avoid the vehicle 515 to help prevent the ADV from colliding, hitting, and/or coming into contact with the vehicle 515. Reference line 550 may be a smooth reference line generated by routing module 307 or may be calculated based on map geometric information such as midpoint values traced along a lane from side curbs and/or lane dividers/markers of path. The reference line 550, the ADV 505, the path, the road 510, and/or other elements illustrated in FIG. 5 may be represented using a Cartesian coordinate system as illustrated by the X axis and Y-axis in FIG. 5. For example, the location of the ADV 505 may be represented using a two dimensional geometric coordinates (e.g., X-Y coordinates, Cartesian coordinates, etc.).

In some embodiments, the reference line 550 (which represents the path for the ADV) may be converted from x-y coordinates to S-L coordinates such that the path may be represented on an S-L graph. In other embodiments, the reference line 550 (which represents the path for the ADV) may be converted from x-y coordinates to S-T coordinates such that the path may be represented on an S-T graph.

As illustrated in FIG. 5, the reference line 550 may have a length 520. The length 520 of the reference line 550 may be represented on the S-axis (e.g., the vertical axis) of the S-T graph, as illustrated and discussed in more detail below. The reference line 550 may be divided or segmented into multiple reference line segments. For example, a first reference line segment may be between the ADV 505 and the distance S0, a second reference line segment may be between the distance S0 and the distance S1, a third reference line segment may be between the distance S1 and the distance S2, etc.

Figure 6A:
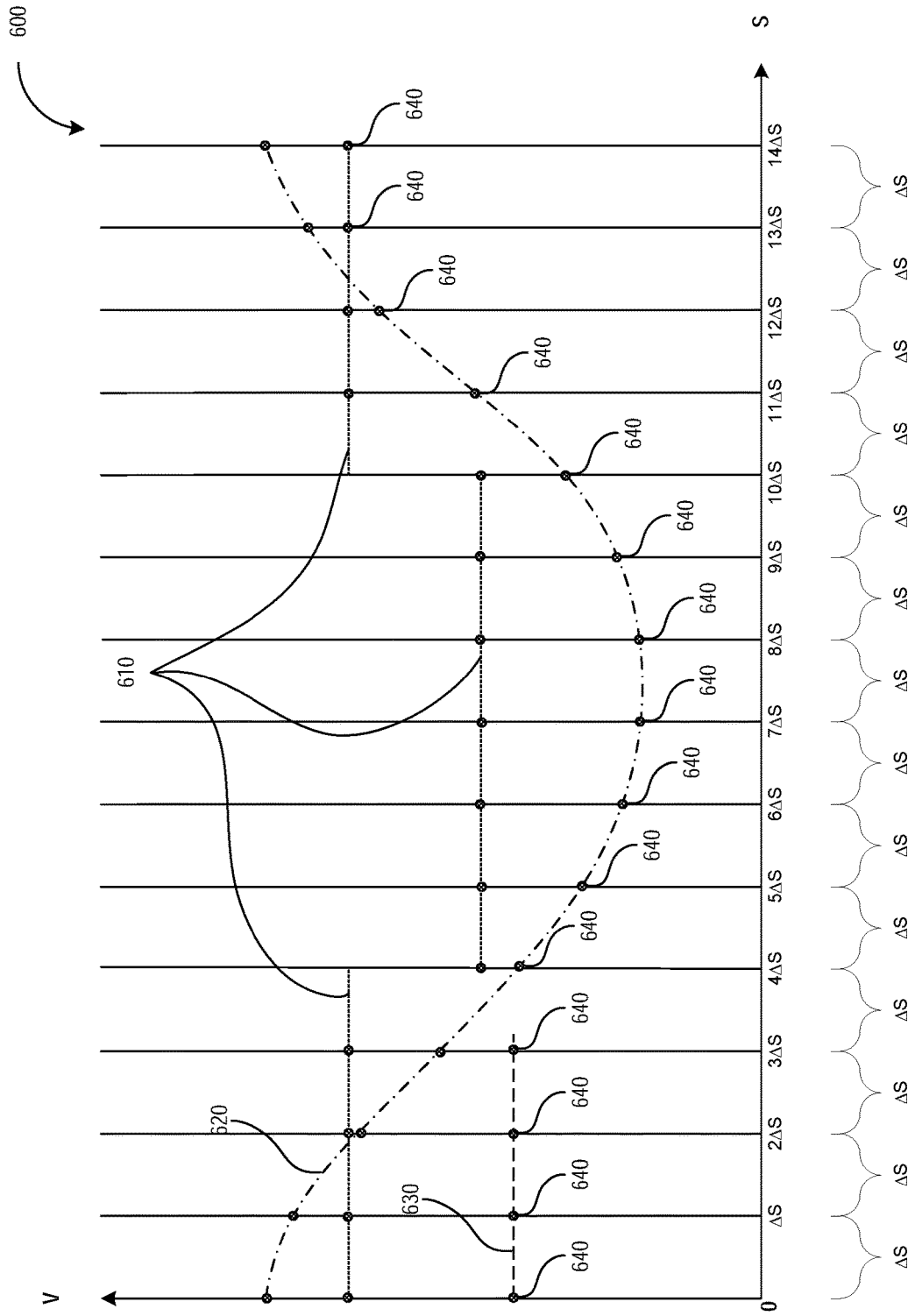
FIG. 6A is a graph illustrating example functions that represent one or more constraints on the speed of an ADV according to one embodiment.

FIG. 6A is a graph 600 illustrating example functions 610, 620, and 630 that represent one or more constraints (e.g., limits, bounds, caps, restrictions, etc.) on the speed of ADV 505 (illustrated in FIG. 5), according to one embodiment. The X-axis of the graph 600 represents the distance along the reference line 550. As discussed above, the ADV 505 may be traveling along a reference line 550 selected and/or generated by the planning module 305 and/or the routing module 307. The Y-axis of the graph 600 represents different speeds for the ADV.

Although the reference line 550 (illustrated in FIG. 5) may indicate a path that the ADV 505 may travel on or take, the reference line 550 may not indicate the speed at which the ADV 505 should travel at different portions, sections, segments, etc., of the reference 550. As discussed above, the planning module 305 may determine (e.g., generate, obtain, calculate, etc.) a set of speeds (e.g., one or more speeds) for the ADV 505 while the ADV 505 travels along different portions of the reference line 550. The planning module 305 may use a speed planning function to determine the set of speeds for the ADV 505 along different portions of the reference line 550.

Various constraints, limits, bounds, etc., may be used by the planning module 305 when determining the set of speeds for the ADV 505 along different portions of the reference line 550. In one embodiment, one type of constraint may be one or more speed limits (e.g., traffic or legal speed limits) that along the reference line 550. For example, the reference line 550 may be along a road in an environment (e.g., along road 510 in environment 500 illustrated in FIG. 5). The road may have different speed limits along different portions of the road. For example, a first portion of the road may have a speed limit of 45 miles per hour (mph), a second portion of the of the road may have a speed limit of 25 mph, and a third portion of the road may have a speed limit of 45 mph. The speed limits (e.g., traffic or legal speed limits) may indicate the maximum speed allowable for the ADV 505 along a portion of the road and/or reference line 550. In some embodiment, the one or more speed limits may be used as both a constraint and as a target and/or object. For example, the ADV 505 should not travel at a speed (e.g., velocity) faster than the speed limit, but should travel at a speed as close to the speed limit as possible to decrease the total travelling time for the ADV 505 to reach a destination. The one or more speed limits along the road and/or reference line 550 are indicated by the function 610, which is represented as three dotted lines in the graph 600. The leftmost dotted line may indicate a speed limit of 45 mph, the center dotted line may indicate a speed limit of 25 mph, and the rightmost dotted line may indicate a speed limit of 45 mph.

In one embodiment, the curvature of the reference line 550 and/or path may also be a constraint (e.g., limit, bound, cap, restriction, etc.) on the speed of the ADV 505. For example, if a portion of the reference line 550 and/or path has a larger curvature (e.g., is more curvy), then the speed at which the ADV 505 travels along that portion of the reference line 550 and/or path may be reduced. If a portion of the reference line 550 and/or path has a smaller curvature (e.g., is less curvy), then the speed at which the ADV 505 travels along that portion of the reference line 550 and/or path may be increased. The reference line 550 and/or path may have different curvatures at different portions of the reference line 550. The speeds that are allowed due to the different curvatures of the reference line 550 and/or path (e.g., a set of curvatures) are indicated by the function 620, which is represented as dotted-and-dashed line in the graph 600.

In one embodiment, obstacles that are also in the environment where the ADV 505 is located may also be a constraint. For example, various static (e.g., non-moving) and/or moving obstacles may be in the environment where the ADV 505 is located. Examples of obstacles may include barriers, dividers, poles, pedestrians, bicycles, motorcycles, vehicles, etc. The distance of the ADV 505 to one or more obstacles as the ADV 505 travels along the reference line 550 and/or path may also affect the speed at which the ADV 505 should travel. A moving obstacle (e.g., a pedestrian, a bicycle, a motorcycle, a vehicle, etc.) may have unexpected behavior (e.g., may move closer to the reference line 550 and/or path) which may cause the ADV 505 to come too close to and/or hit the obstacle. In addition, the sensor data generated by the sensors of the ADV 505 may have errors and/or inaccuracies (e.g., due to faulty or uncalibrated sensors, due to bad weather conditions, etc.). These errors may also result in the ADV 505 moving too close to an obstacle. If the ADV 505 is traveling around an obstacle at some portion of the reference line 550 and/or path, it may be useful to reduce the speed of the ADV 505. Referring to FIG. 5, the speeds that are allowed due to the vehicle 515 (e.g., an obstacle) are indicated by the function 630, which is represented as dashed line in the graph 600.

As illustrated in FIG. 6A, the three functions 610, 620, and 630 are three individual functions. Functions 610 and 630 may be functions that are discontinuous or are not continuous (e.g., may be discontinuous functions). Because the functions 610 and 630 are discontinuous, the functions 610 and 630 may not be differentiable (e.g., may be non-differentiable functions). The planning module 305 may be configured to use a smooth, continuous, and/or differentiable function to represent the constraints, limits, etc., on the speed of the ADV 505. A single smooth, continuous, and/or differentiable function that represents multiple different types of constraints, limits, etc., on the speed of the ADV 505 may allow the planning module 305 to determine a set of speeds for the ADV 505 more quickly and/or efficiently. However, because functions 610 and 630 are not continuous, it may not be possible to combine functions 610, 620, and 630 into a single composite function that is continuous.

As discussed above, the X-axis of the graph 600 represents the distance along the reference line 550 illustrated in FIG. 5. The reference line 550 may be divided into discrete segments based on a resolution (e.g., a specified or desired resolution). For example, the reference line 550 may divided into segments or portions that are each 1 foot long, 5 feet long, 1 meter long, 10 meters long, or any other appropriate length. The length of each segment or portion may be referred to as the resolution. The length of each segment or portion may also be referred to as $\Delta s$. A configuration file or parameter may indicate a specific or desired resolution to the planning module 305, or a user may provide the specific or desired resolution via user input. In one embodiment, the planning module 305 may also divide the speed constraints and/or limits represented by the functions 610, 620, and 630 based on the resolution or $\Delta s$. For example, the planning module may identify discrete distances along the X-axis (e.g., $\Delta s$, $2\Delta s$, $3\Delta s$, etc.). The planning module 305 may determine the value of each of the functions 610, 620, and 630 at each of those distances. For example, the planning module 305 may determine a first set of values for the functions 610, 620, and 630 at $\Delta s$ (e.g., a value for function 610 at $\Delta s$, a value for function 620 at $\Delta s$, and a value for function 630 at $\Delta s$), a second set of values for the functions 610, 620, and 630 at $2\Delta s$, a third set of values for the functions 610, 620, and 630 at $3\Delta s$, etc. The values for each of the functions 610, 620, and 630 at each of the discrete distances along the X-axis (e.g., $\Delta s$, $2\Delta s$, $3\Delta s$, etc.), are represented by the dots in the graph. The values for reach of the functions 610, 620, and 630 may also be referred to as speed values. In other words, if there are m discrete distances (or m points), then the values for each of the functions 610, 620 and 630 at the discrete distances may represented as $\dot{s}_i^0, \dot{s}_i^1, \ldots \dot{s}_i^{m-2}, \dot{s}_i^{m-1}$. Determining the values for each of the functions 610, 620, and 630 at each of the discrete distances along the X-axis may be referred to as discretizing the functions 610, 620, and/or 630 (e.g., discretizing the set of speed limits represented by function 610, a set of curvatures of the reference line represented by function 620, and an obstacle represented by function 630).

In one embodiment, the planning module 305 may determine the lowest speed value of the functions 610, 620, and 630 at each of the discrete distances along the X-axis. For example, the planning module 305 may determine the lowest speed value of the functions 610, 620, and 630 at $\Delta s$, at 2Δs, at 3Δs, at 4Δs, at 5Δs, etc. The lowest speed values are represented by the dots 640 in the graph 400. For example, the lowest speed value (e.g., the lowest speed) at Δs is from function 630, the lowest speed at 7Δs is from function 620, and the lowest speed at 13Δs is from function 610.

Figure 6B:
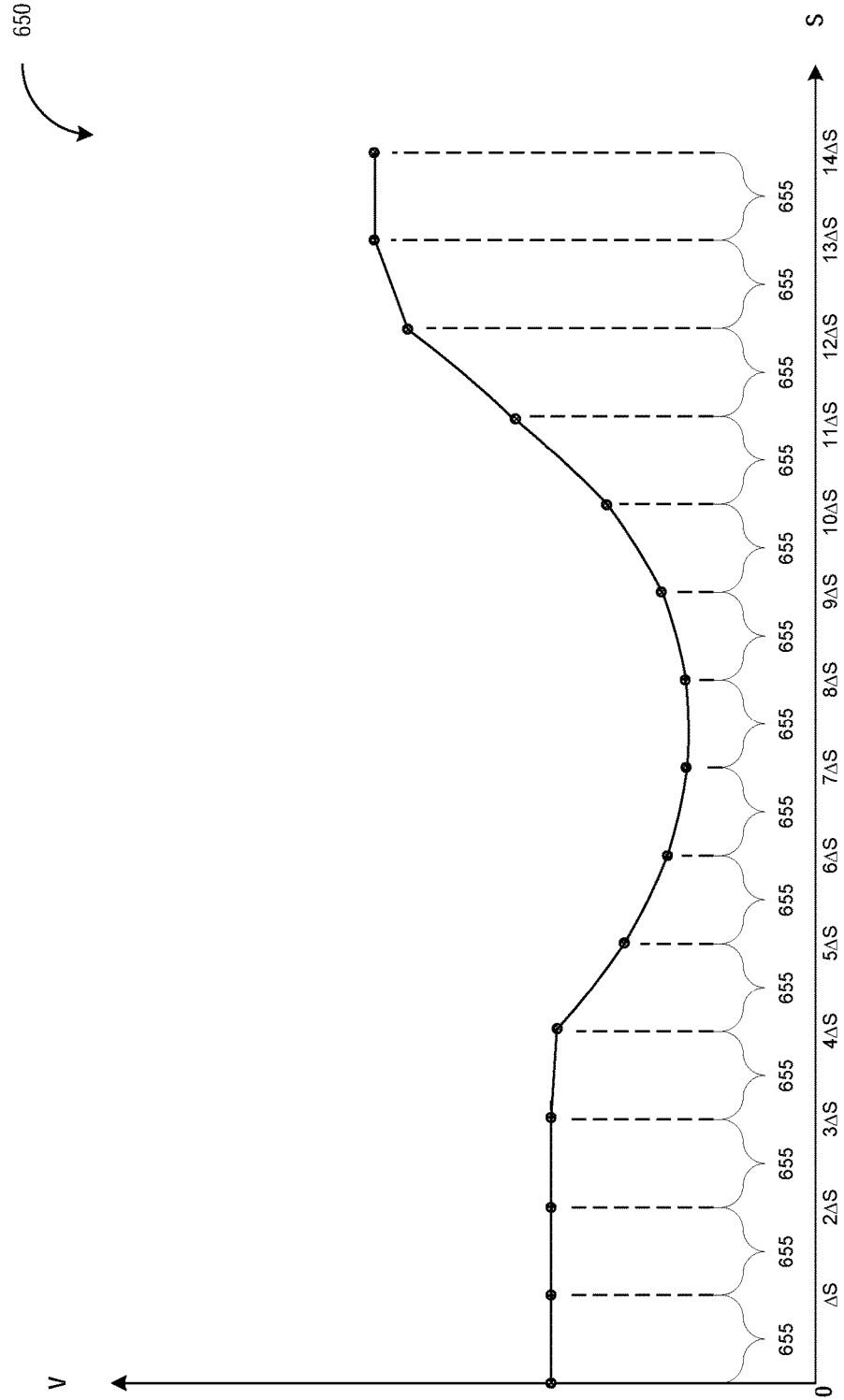
FIG. 6B is a graph 650 illustrating an example speed constraint function according to one embodiment.

FIG. 6B is a graph 650 illustrating an example speed constraint function 660 according to one embodiment. The X-axis of the graph 650 represents the distance along the reference line 550. As discussed above, the ADV 505 may be traveling along a reference line 550 selected and/or generated by the planning module 305 and/or the routing module 307. The Y-axis of the graph 600 represents different speeds for the ADV.

In one embodiment, the planning module 305 may determine, generate, obtain, calculate, etc., a speed constraint function ṡ(s) based on the set of speed limits associated with the environment (e.g., function 610), a set of curvatures along the reference line 550 and/or path (e.g., function 620), and one or more obstacles (e.g., function 630). The speed constraint function ṡ(s) may be a continuous function. Because the speed constraint function ṡ(s) is a continuous function, the speed constraint function ṡ(s) may also be a differentiable function. The speed constraint function ṡ(s) may be differentiable because the derivative ṡ' (e.g., dṡ/ds) is also continuous.

As discussed above, the planning module 305 may determine the lowest speed value of the functions 610, 620, and 630 (illustrated in FIG. 6A) at each of the discrete distances along the X-axis *e.g., Δs, 2Δs, 3Δs, etc.). In one embodiment, the planning module 305 may connect each of the speed values (e.g., each of the lowest speed values) to form segments 655. Each segment 655 is represented as a line between two dots in the graph 650. For example, a first segment 655 (from the left of the graph 600) may be formed by connecting the first speed value (e.g., the first dot from the left of the graph 600) with the second speed value (e.g., the second dot from the left of the graph 600) one of the speed values with a next speed value. In one embodiment, the planning module may use a polynomial function to represent each segment 655. The polynomial functions (which represent the segments 655) may be quintic polynomial functions. In other embodiments, other types of polynomial functions may be used (e.g., quadratic polynomials). The polynomial functions may be used, combined, concatenated, etc., to generate, determine, obtain, etc., the speed constraint function. For example, each of the polynomial functions may form a piece portion of the speed constraint function. Thus, the speed constraint function may be a piecewise combination of the different polynomial functions that represent the segments 655.

As discussed above, the speed constraint function may be a combination of the different polynomial functions that represent the segments 655. The speed values (e.g., the dots) may connect the multiple segments 655 together. In one embodiment, the planning module may use a constant second term (e.g., a constant second order term) ṡ" to connect the consecutive segments 655 (e.g., to perform the piecewise combination of the different polynomial functions that represent the segments 655). The second term may be defined using the following equation:

$$\ddot{s}''_{i\rightarrow i+1} = (\dot{s}'_{i+1} - \dot{s}'_i)/\Delta s \quad (1)$$

The planning module may perform an optimization procedure defined using the following equation:

$$\dot{s}_i, i \in [0, n-1], i \in Z \quad (2)$$

The objective of the optimization procedure may be to minimize the value of the equation:

$$\Sigma_i^{n-2} \ddot{s}''_{i\rightarrow i+1} \quad (3)$$

The optimization procedure may be subject to the following constraints:

$$\dot{s}_{i+1} = \dot{s}_i + (\dot{s}'_i + \dot{s}'_{i+1}) * \Delta s * 0.5, i \in [0, n-2], i \in Z \quad (4)$$

$$\begin{array}{cccccc} s_0 & \xrightarrow{\Delta s} & s_1 & \xrightarrow{\Delta s} & s_2 & \cdots & s_{n-2} & \xrightarrow{\Delta s} & s_{n-1} \\ \dot{s}'_0 & & \dot{s}'_1 & & \dot{s}'_2 & \cdots & \dot{s}'_{n-2} & & \dot{s}'_{n-1} \end{array} \quad (5)$$

where Z is a set of integer numbers.

The optimization procedure may determine, generate, obtain, calculate, etc., the speed constraint function ṡ(s) based on the polynomial functions that represent the segments 655 using the equations (1)-(5). The speed constraint function ṡ(s) based may be a continuous function. The speed constraint function ṡ(s) may also be first-order differentiable piecewise function that is smoothly connected at the speed values (e.g., that is connected at connect each of the speed values represented by dots in the graph 650).

One or more of the embodiments described here may allow the ADV 505 (e.g., the planning module 305) to generate, obtain, determine, etc., a single smooth, continuous, and/or differentiable function based on multiple other functions that represent speed limits/constraints, where at least one of the other functions is not continuous. By combining multiple functions, at least one of which is not continuous, into a single smooth, continuous, and/or differentiable function, the planning module 305 is able to use the single function to represent the limits or constraints on the speed of the ADV 505 which allows the ADV 505 and/or the planning module 305 to determine a set of speeds for the ADV 505 more quickly and/or efficiently. In addition, the planning module 305 may be configured to use a single continuous speed constraint function when planning or determining a set of speeds for the ADV along the reference line 550. It may be difficult or time-consuming to change or modify the planning module 305 to use multiple separate functions which may not be continuous. In addition, if the speed constraint function is a continuous and/or differentiable function, this allows the planning module 305 to directly use the speed constraint function (e.g., directly using the speed constraint function as part of a QP optimization). A discontinuous and/or non-differentiable function may not be directly usable by the planning module 305. Thus, generating a single speed constraint function that is smooth, continuous, and/or differentiable may be more efficient than changing or modifying the planning module 305.

Figure 7:
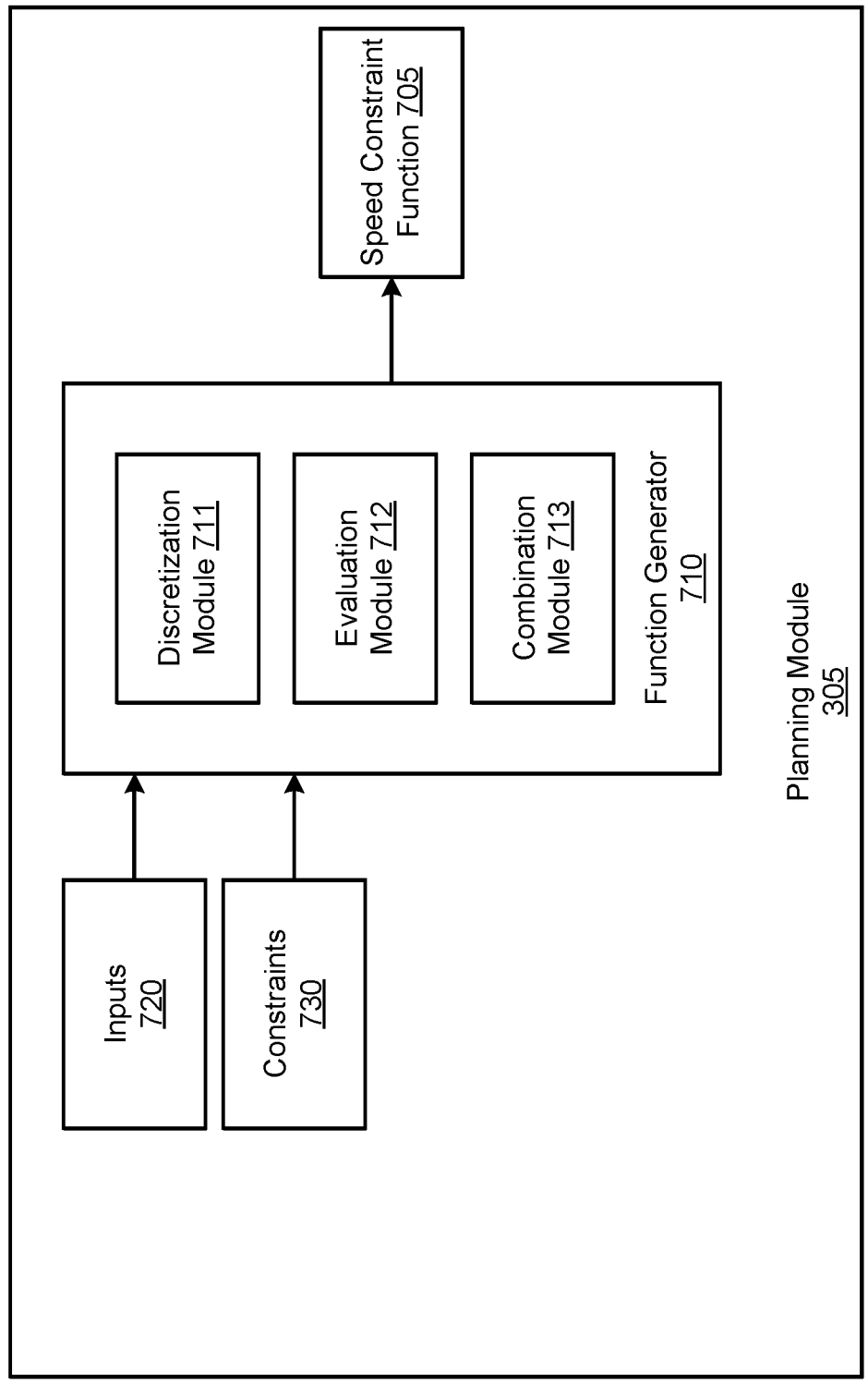
FIG. 7 is a block diagram illustrating various example components involved in the speed constraint function process according to one embodiment.

FIG. 7 is a block diagram illustrating various example components involved in the optimization process according to one embodiment. As illustrated in FIG. 7, the planning module includes a function generator 710. Inputs 720 are provided for the function generator 710. The inputs 720 may include a reference line and/or a path for the ADV. The constraints 730 may include speed limit constraints (e.g., legal speed limits), curvature constraints (e.g., limits on the speed of the ADV due to one or more curvatures of a path), and obstacle constraints (e.g., limits on the speed of the ADV due to one or more obstacles). The speed limit constraints, the curvature constraints, and the obstacle constraints may be represented using separate functions (e.g., functions 610, 620, and 630 illustrated in FIG. 6A). The function generator includes a discretization module 711, an evaluation module 712, and a combination module 713. The discretization module 711 may discretize the speed limit constraints, the curvature constraints, and the obstacle constraints, as discussed above (e.g., determine a resolution for discretizing the constraints and/or functions). The evaluation module 712 may evaluate the constraints and/or functions and identify the lowest value (e.g., lowest speed value), as discussed above. The combination module 715 may form segments between the different speed values and may generate the speed constraint function, as discussed above. The speed constraint function may be a generated based on multiple polynomial functions (e.g., multiple quintic polynomial functions) representing the multiple segments, as discussed above. The speed constraint function based may be a continuous function. The speed constraint function may also be first-order differentiable piecewise function that is smoothly connected at different speed values, as discussed above.

Figure 8:
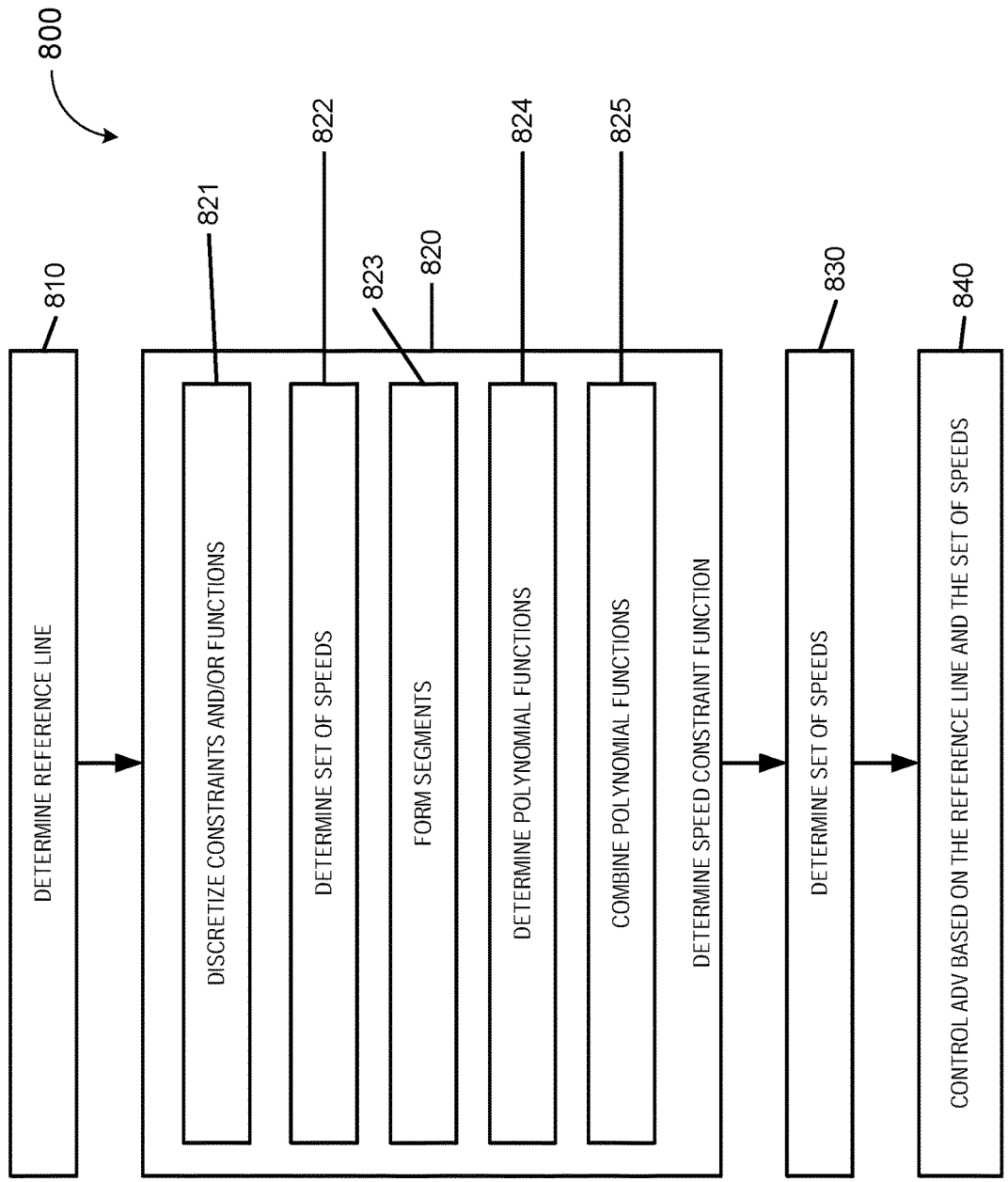
FIG. 8 is a flowchart illustrating an example method for controlling an ADV according to one embodiment.

FIG. 8 is a flowchart illustrating an example method for controlling an ADV according to one embodiment. Process 800 may be performed by processing logic which may include software, hardware, or a combination thereof. Process 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 800 may be performed by a planning module (e.g., planning module 305 illustrated in FIG. 3B).

At block 810, the process 800 determines a reference line for the ADV. As discussed above, the reference line may indicate a path for the ADV through and environment. At block 820, the process 800 determines a speed constraint function based on a set of speed limits, a set of curvatures of the path (e.g., limits on the speed due to the set of curvatures), and a set of obstacles in the environment (e.g., limits on the speed due to the set of obstacles). To determine the speed constraint function, the process 800 may perform blocks 821 through 825. At block 821, the process 800 may discretize the constraints and/or functions, as discussed above. At block 822, the process 800 may determine a set of speeds as discussed above in conjunction with FIG. 6A. At block 932, the process 800 may form segments between different speeds or speed values, as discussed above in conjunction with FIG. 6B. At block 824, the process 800 may determine polynomial functions for the different segments. At block 825, the process 800 may combine the polynomial functions to generate the speed constraint functions, as discussed above. At block 830, the process may determine a set of speeds based on the speed constraint function. At block 830, the process may control the ADV based on the reference line and the set of speeds.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
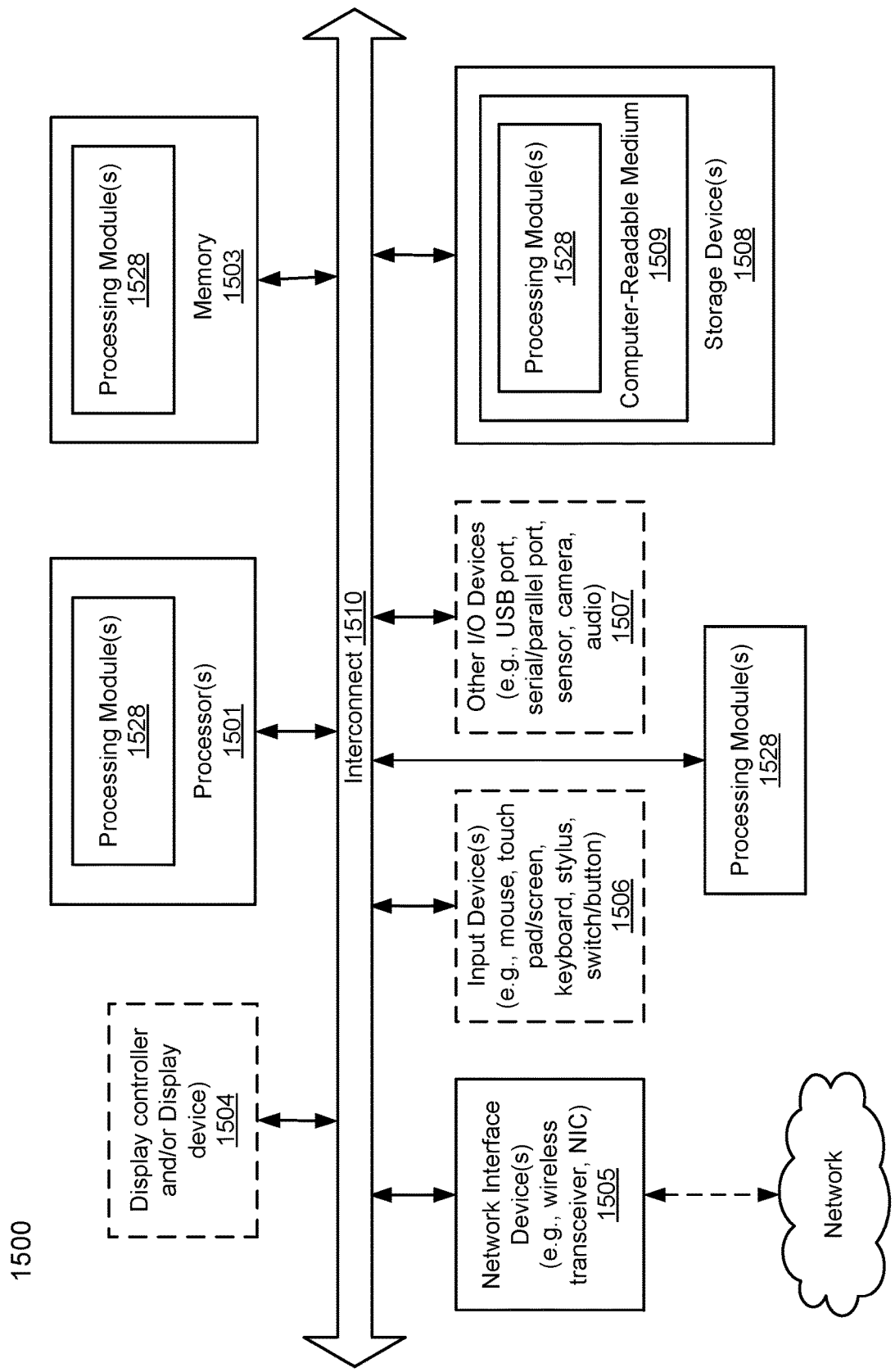
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1, and path planner 309 of FIG. 6. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and path planner 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method, comprising:
   determining a first reference line representing a path through an environment for an autonomous driving vehicle;
   determining a speed constraint function based on a set of speed limits associated with the environment, a set of curvatures of the path, and a set of obstacles in the environment, wherein the speed constraint function comprises a continuous function, and wherein the determining the speed constraint function comprises discretizing one or more of the set of speed limits associated with the environment, the set of curvatures of the path, and the set of obstacles in the environment, based on a specified resolution, wherein the speed constraint function includes a combination of a set of polynomial functions that represent a set of segments, and wherein a constant second term is used to connect consecutive segments of the set of segments;
   determining a set of speeds for the path through the environment based on the speed constraint function; and
   controlling the autonomous driving vehicle based on the path and the set of speeds.

2. The method of claim 1, wherein the determining the speed constraint function further comprises:
   determining the set of speeds based on the set of speed limits associated with the environment, the set of curvatures of the path, the set of obstacles in the environment, and the specified resolution.

3. The method of claim 2, wherein the determining the speed constraint function further comprises:
   forming the set of segments between the set of speeds by connecting each speed in the set of speeds with a next speed in the set of speeds.

4. The method of claim 1, wherein:
   the set of speed limits associated with the environment, the set of curvatures of the path, and the set of obstacles in the environment are represented using a set of functions; and
   at least one of the set of functions comprises a discontinuous function.

5. The method of claim 1, wherein:
   the set of speed limits associated with the environment, the set of curvatures of the path, and the set of obstacles in the environment are represented using a set of functions; and
   at least one of the set of functions is not differentiable.

6. The method of claim 1, wherein the speed constraint function comprises a differentiable function.

7. A non-transitory machine-readable medium having instructions stored therein, which when executed by a processor, cause the processor to perform operations, the operations comprising:
   determining a first reference line representing a path through an environment for an autonomous driving vehicle;
   determining a speed constraint function based on a set of speed limits associated with the environment, a set of curvatures of the path, and a set of obstacles in the environment, wherein the speed constraint function comprises a continuous function, and wherein the determining the speed constraint function comprises discretizing one or more of the set of speed limits associated with the environment, the set of curvatures of the path, and the set of obstacles in the environment, based on a specified resolution, wherein the speed constraint function includes a combination of a set of polynomial functions that represent a set of segments, and wherein a constant second term is used to connect consecutive segments of the set of segments;

determining a set of speeds for the path through the environment based on the speed constraint function; and controlling the autonomous driving vehicle based on the path and the set of speeds.

8. The non-transitory machine-readable medium of claim 7, wherein the determining the speed constraint function further comprises:

determining the set of speeds based on the set of speed limits associated with the environment, the set of curvatures of the path, the set of obstacles in the environment, and the specified resolution.

9. The non-transitory machine-readable medium of claim 8, wherein the determining the speed constraint function further comprises:

forming the set of segments between the set of speeds by connecting each speed in the set of speeds with a next speed in the set of speeds.

10. The non-transitory machine-readable medium of claim 7, wherein the determining the speed constraint function further comprises:

determining the set of polynomial functions to represent the set of segments, wherein each polynomial function in the set of polynomial functions represents a respective segment in the set of segments.

11. The non-transitory machine-readable medium of claim 10, wherein the set of polynomial functions comprises a set of quintic polynomial functions.

12. The non-transitory machine-readable medium of claim 10, wherein the determining the speed constraint function further comprises:

combining the set of polynomial functions to generate the speed constraint function.

13. The non-transitory machine-readable medium of claim 7, wherein:

the set of speed limits associated with the environment, the set of curvatures of the path, and the set of obstacles in the environment are represented using a set of functions; and at least one of the set of functions comprises a discontinuous function.

14. The non-transitory machine-readable medium of claim 7, wherein:

the set of speed limits associated with the environment, the set of curvatures of the path, and the set of obstacles in the environment are represented using a set of functions; and at least one of the set of functions is not differentiable.

15. The method of claim 9, wherein the determining the speed constraint function further comprises:

determining the set of polynomial functions to represent the set of segments, wherein each polynomial function in the set of polynomial functions represents a respective segment in the set of segments.

16. The method of claim 15, wherein the set of polynomial functions comprises a set of quintic polynomial functions.

17. The method of claim 15, wherein the determining the speed constraint function further comprises:

combining the set of polynomial functions to generate the speed constraint function.

18. A data processing system, comprising:

a processor; and a memory coupled to the processor to store instructions, which when executed by the processor, cause the processor to perform operations, the operations including:

determining a first reference line representing a path through an environment for an autonomous driving vehicle;

determining a speed constraint function based on a set of speed limits associated with the environment, a set of curvatures of the path, and a set of obstacles in the environment, wherein the speed constraint function comprises a continuous function, and wherein the determining the speed constraint function comprises discretizing one or more of the set of speed limits associated with the environment, the set of curvatures of the path, and the set of obstacles in the environment, based on a specified resolution, wherein the speed constraint function includes a combination of a set of polynomial functions that represent a set of segments, and wherein a constant second term is used to connect consecutive segments of the set of segments;

determining a set of speeds for the path through the environment based on the speed constraint function; and controlling the autonomous driving vehicle based on the path and the set of speeds.

19. The data processing system of claim 18, wherein the determining the speed constraint function further comprises:

determining the set of polynomial functions to represent the set of segments, wherein each polynomial function in the set of polynomial functions represents a respective segment in the set of segments.

20. The data processing system of claim 18, wherein the determining the speed constraint function further comprises:

combining the set of polynomial functions to generate the speed constraint function.

* * * * *